United States Patent [19]

Nagashima et al.

[11] Patent Number: 5,409,529
[45] Date of Patent: Apr. 25, 1995

[54] INK, AND INK-JET RECORDING METHOD AND INSTRUMENT USING THE SAME

[75] Inventors: Akira Nagashima, Tokyo; Tokuya Ohta, Yokohama; Shinichi Tochihara, Hadano; Hiromichi Noguchi, Atsugi, all of Japan

[73] Assignee: Canon Kabushiki Kaisha, Tokyo, Japan

[21] Appl. No.: 112,988

[22] Filed: Aug. 30, 1993

[30] Foreign Application Priority Data

Sep. 1, 1992 [JP] Japan ............................ 4-255395
Jul. 30, 1993 [JP] Japan ............................ 5-207020

[51] Int. Cl.$^6$ .............................................. C09D 11/02
[52] U.S. Cl. .................... 106/22 H; 106/20 R; 106/23 H
[58] Field of Search ............... 106/20 R, 22 R, 22 H, 106/23 H

[56] References Cited

U.S. PATENT DOCUMENTS

| | | | |
|---|---|---|---|
| 3,903,034 | 9/1975 | Zabiak et al. | 260/29.6 WB |
| 4,155,768 | 5/1979 | Adams et al. | 106/22 H |
| 4,197,135 | 4/1980 | Bailey et al. | 106/22 H |
| 4,655,834 | 4/1987 | Haruta et al. | 106/20 |
| 4,655,835 | 4/1987 | Haruta et al. | 106/20 |
| 4,683,002 | 7/1987 | Mirua et al. | 106/20 |
| 4,923,515 | 5/1990 | Koike et al. | 106/22 |
| 5,017,224 | 5/1991 | Tomita et al. | 106/22 H |
| 5,017,644 | 5/1991 | Fuller et al. | 106/22 H |
| 5,019,164 | 5/1991 | Tomita et al. | 106/22 H |
| 5,078,790 | 1/1992 | Tochihara et al. | 106/20 |
| 5,080,716 | 1/1992 | Aoki et al. | 106/20 |
| 5,099,255 | 3/1992 | Koike et al. | 346/1.1 |
| 5,100,470 | 3/1992 | Hindagolla et al. | 106/22 H |
| 5,101,217 | 3/1992 | Iwata et al. | 346/1.1 |
| 5,106,416 | 4/1992 | Moffatt et al. | 106/20 |
| 5,125,969 | 6/1992 | Nishiwaki et al. | 106/22 |
| 5,131,949 | 7/1992 | Tochihara et al. | 106/20 |
| 5,132,700 | 7/1992 | Tochihara et al. | 346/1.1 |
| 5,135,571 | 8/1992 | Shirota et al. | 106/20 |
| 5,137,570 | 8/1992 | Nishiwaki et al. | 106/22 |
| 5,148,186 | 9/1992 | Tochihara et al. | 346/1.1 |
| 5,160,370 | 11/1992 | Suga et al. | 106/20 |
| 5,172,133 | 12/1992 | Suga et al. | 346/1.1 |
| 5,213,613 | 5/1993 | Nagashima et al. | 106/20 R |
| 5,229,786 | 7/1993 | Suga et al. | 346/1.1 |
| 5,244,496 | 9/1993 | Easton et al. | 106/22 H |
| 5,254,159 | 10/1993 | Bundlach et al. | 106/22 H |

FOREIGN PATENT DOCUMENTS

| | | |
|---|---|---|
| 0472196 | 2/1992 | European Pat. Off. |
| 57-577609 | 4/1982 | Japan |
| 2255876 | 10/1990 | Japan |
| 2296878 | 12/1990 | Japan |

*Primary Examiner*—Helene Klemanski
*Attorney, Agent, or Firm*—Fitzpatrick, Cella, Harper & Scinto

[57] ABSTRACT

Disclosed herein is an ink comprising at least a coloring material and a liquid medium dissolving or dispersing the coloring material therein, wherein the viscosity of the ink reaches a maximum peak in a pH range of from 4 to 10.

22 Claims, 4 Drawing Sheets

INK, AND INK-JET RECORDING METHOD AND INSTRUMENT USING THE SAME

BACKGROUND OF THE INVENTION

1. Field of the Invention

The present invention relates to an ink, and an ink-jet recording method and instruments making use of the ink. More specifically, it relates to an ink which can provide prints excellent in water resistance and permits high-image quality recording using so-called plain paper such as acid paper and neutralized paper, which are commonly used in offices, and an ink-jet recording method and instruments making use of such an ink.

2. Related Background Art

Inks with greatly various manners of being composed have been hitherto reported in respect of inks for writing utensils (fountain pens, marking pens, ball-point pens making use of a water-based ink, etc.) and for ink-jet recording. In particular, in recent years, detailed researches and developments have been made from various aspects such as compositions and physical properties of inks because of a strong demand for improving the water resistance of prints making use of plain paper such as paper for copying, paper for reporting, notepaper and letter paper, which are commonly used in offices.

For example, Japanese Patent Application Laid-Open Nos. 2-296878 and 2-255876 have proposed to contain a polyamine in a water-based ink composition, thereby improving the water resistance of the resulting prints.

In such an ink, there is however a potential problem that clogging may occur, or the stability of the ink may be impaired because its basic mechanism of improving the water resistance is principally based on the formation of salt at the hydrophilic group site of a dye contained in the ink.

In the above-described ink, therefore, it has also been considered to contain a dissolution stabilizer in the ink for a purpose of improving the stability of the ink. In this case, however, it is necessary to contain a great amount of the dissolution stabilizer in the ink, so that the image quality of prints formed with such an ink becomes deteriorated.

In ink-jet recording, the fixing of an ink provided on a recording material such as plain paper is principally dependent on the natural penetration of the ink in the recording material and its evaporation, so that a problem of deterioration in image quality arises in particular.

Japanese Patent Application Laid-Open No. 57-577760 has proposed a method in which an amphoteric surfactant is contained in an ink to improve the water resistance of the resulting prints.

However, the above ink was such that the water resistance of prints formed therefrom was dependent on the kind of recording material to be used. More specifically, the ink had provided either prints excellent in water resistance or prints undue in image smearing and poor in water resistance depending on the surface pH, kind of sizing agent, kind of cellulose and the like of a recording material to be used.

Even if the ink could provide prints good in water resistance, it was poor in practicability in that it might become viscous, and clogging might occur. Besides, amphoteric surfactants generally contained many impurities therein, so that the reliability of the ink was lowered.

As described above, there has not yet been found an ink which can provide prints excellent in quality and water resistance, has excellent practicability, and can provide prints good in water resistance irrespective of materials of recording media.

SUMMARY OF THE INVENTION

It is accordingly an object of the present invention to provide an ink which can provide prints having sufficient water resistance without adversely affecting the image quality of the prints when conducting recording on so-called plain paper such as acid paper and neutralized paper, commonly used in offices and the like, and permits high-quality printing without the least problem even after stored for a long period of time and also without the problem of clogging, and an ink-jet recording method and instruments making use of such an ink.

The above object can be achieved by the present invention described below. According to the present invention, there is thus provided an ink comprising at least a coloring material and a liquid medium dissolving or dispersing the coloring material therein, wherein the viscosity of the ink reaches a maximum peak in a pH range of from 4 to 10.

According to the present invention, there is also provided an ink-jet recording method comprising ejecting droplets of an ink out of an orifice in accordance with a recording signal to make a record on a recording material, wherein said ink is the ink described above.

According to the present invention, there is further provided a recording unit comprising an ink container portion with an ink held therein and a head from which the ink is ejected in the form of ink droplets, wherein said ink is the ink described above.

According to the present invention, there is still further provided an ink cartridge comprising an ink container portion with an ink held therein, wherein said ink is the ink described above.

According to the present invention, there is yet still further provided an ink-jet recording apparatus comprising a recording unit having an ink container portion with an ink held therein and a head from which the ink is ejected in the form of ink droplets, wherein said ink is the ink described above.

According to the present invention, there is yet still further provided an ink-jet recording apparatus comprising a recording head from which an ink is ejected in the form of ink droplets, an ink cartridge having an ink container portion with the ink held therein, and an ink feeder for feeding the ink from the ink cartridge to the recording head, wherein said ink is the ink described above.

DESCRIPTION OF THE PREFERRED EMBODIMENTS

The present inventors have carried out an extensive investigation on various manners of ink compositions with a view toward providing prints improved in water resistance using water-soluble inks. As a result, it has been found that when the viscosity of an ink comprising at least a coloring material and a liquid medium dissolving or dispersing the coloring material therein is controlled so as to reach a maximum peak in a pH range of from 4 to 10, such an ink permits the formation of images free from any feathering without impairing the quality of images formed with the ink, for example, even on plain paper which causes feathering in the case making use of the conventional inks, can prevent boundary bleeding between areas applied with inks of different colors upon formation of color images, can achieve the improvement in water resistance of resulting prints, and remains good in quality even after stored for a long period of time.

It has also been found that even when such an ink is used in ink-jet recording, the reliability of an ink-jet recording system is not impaired at all.

The present invention has been led to completion on the basis of these findings.

The reason why the ink according to the present invention provides prints good in water resistance is not yet understood clearly. However, it is inferentially believed to be as follows:

(1) The pH of a recording material generally used is within a range of from acidity to neutrality at its surface. Therefore, when the ink according to the present invention is applied to such a recording material to conduct recording, the viscosity increase of the ink occurs rapidly as the volatile component in the ink vaporizes, so that a state of bonding is created between individual components in the ink remaining on the recording material and the components of the recording material.

At this time, the coloring material bears a part of the bonding state, and is trapped in the interior of the bonding state, for example, in spaces in a network. Therefore, the coloring material loses flowability, so that feathering upon recording is prevented, and the water resistance of a resulting print becomes good. Besides, the occurrence of boundary bleeding between areas applied with inks of different colors is also prevented.

(2) Viewing the water resistance of the print from another angle, if water is put on the ink according to the present invention, which has been provided on a recording material and then fixed, the components of the ink, which forms the print, forms a high-viscous and low-flow product, for example, like a water-resistant film, at its interface with the water because the pH of water commonly used or rainwater is within a range of from weak acidity to near neutrality, whereby the water resistance of the print is improved.

The present invention will hereinafter be described in more detail by the following preferred embodiments.

Figure 7:
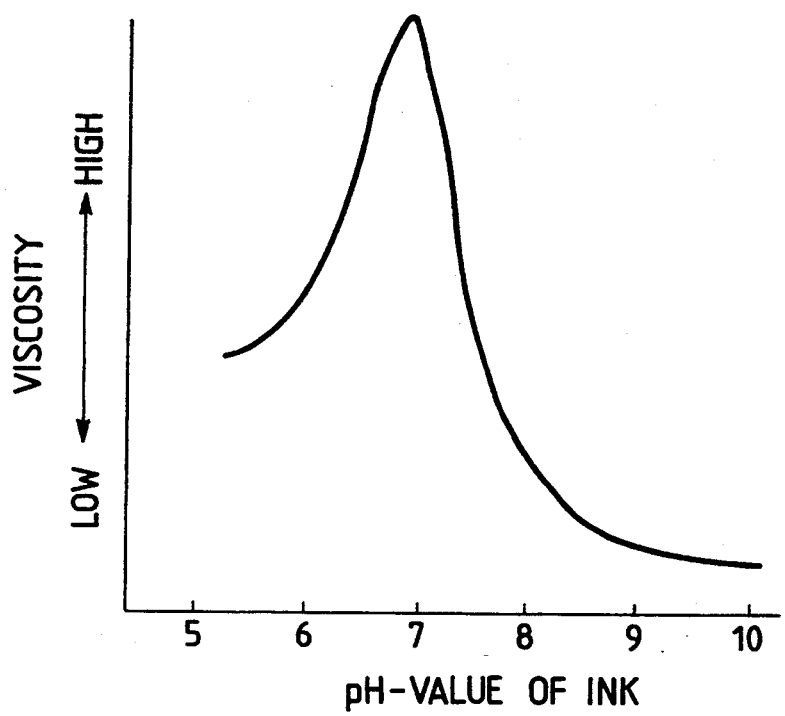
FIG. 7 is a diagram illustrating the relationship between the pH and viscosity of an ink according to the present invention.

The ink according to the present invention, i.e., an ink whose viscosity reaches a maximum peak in a pH range of from 4 to 10 is an ink exhibiting a viscosity characteristic as shown in FIG. 7 when an acid compound such as hydrochloric acid or acetic acid is added to the ink to change its pH.

Figure 8:
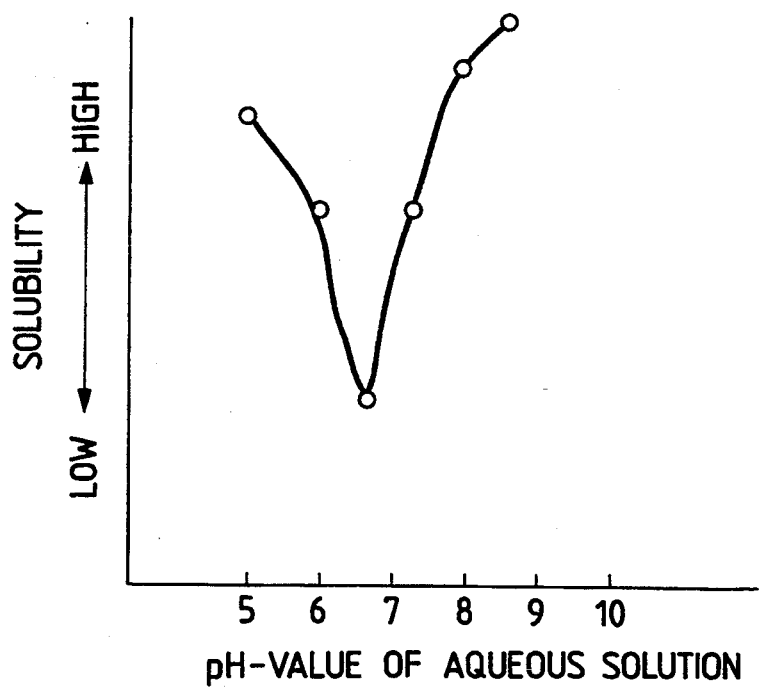
FIG. 8 is a diagram illustrating the relationship between the pH of aqueous solution and solubility of a compound used in the present invention.

A compound used in a preferred embodiment of the present invention, whose solubility reaches a minimum peak when the pH of an ink is within a range of from 4 to 10, is a compound exhibiting a solubility characteristic as shown in FIG. 8, for example, when the compound is dissolved in the ink.

Among such compounds, a preferred compound from the structural viewpoint is at least one compound selected from the group consisting of secondary amines and derivatives thereof, tertiary amines and derivative thereof, and complexes thereof. Such a compound has at least one substituent group selected from an alkyl group, a carboxyl group, a salt of the carboxyl group, a sulfonic group and a salt of the sulfonic group.

Of such compounds, particularly preferred is a compound represented by the general formula

wherein $R_1$ denotes an alkyl group having 1 to 48 carbon atoms, or a hydrogen atom, $R_2$ denotes $(CH_2)_a$—$X_1$ or a hydrogen atom, in which a is an integer of 1 to 4, $R_3$ denotes $(CH_2)_b$—$X_2$, $R_4$—Y or a hydrogen atom, in which b is an integer of 1 to 4, $R_4$ denotes an alkyl group having 1 to 48 carbon atoms, or a hydrogen atom, Z denotes $(NR_5C_lH_{2l})_c(NHC_nH_{2n})_d$, in which l is an integer of 2 to 4, n is an integer of 2 to 4, and c+d is an integer of 0 to 50, Y denotes $(NR_6C_mH_{2m})_e(NHC_pH_{2p})_f$, m is an integer of 2 to 4, p is an integer of 2 to 4, and e+f is an integer of 0 to 50, $R_5$ denotes $(CH_2)_g$—$X_3$, in which g is an integer of 1 to 4, $R_6$ denotes $(CH_2)_h$—$X_4$, in which h is an integer of 1 to 4, and $X_1$, $X_2$, $X_3$ and $X_4$ are independently selected from the group consisting of a carboxyl group, a salt of the carboxyl group, a sulfonic group, a salt of the sulfonic group and a hydrogen atom, with a proviso that $R_2$ and $R_3$, and c and e are not a hydrogen atom and 0 respectively at the same time, and $X_1$, $X_2$, $X_3$ and $X_4$ are not a hydrogen atom at the same time.

In the compound represented by the general formula (I), taking the stability of ink performance and the like into consideration, it is preferable that $X_1$, $X_2$, $X_3$ and $X_4$ be independently selected from salts of carboxyl and sulfonic groups, and a hydrogen atom. The reason is that if $X_1$, $X_2$, $X_3$ and $X_4$ are independently selected from a carboxyl group and a sulfonic group, the compound of the general formula (I) tends to form a cyclic compound, thereby lowering the performance and reliability of the ink.

In the compound represented by the general formula (I), it is more preferable that $R_1$ and $R_4$ be independently an alkyl group having 1 to 32 carbon atoms, c+d and e+f be independently an integer of 0 to 16, and a, b, g and h be independently an integer of 1 or 2.

Preferred compounds included in the general formula (I) are mentioned below. However, the present invention is not limited to these compounds. Incidentally, these compounds may be used in any combination thereof.

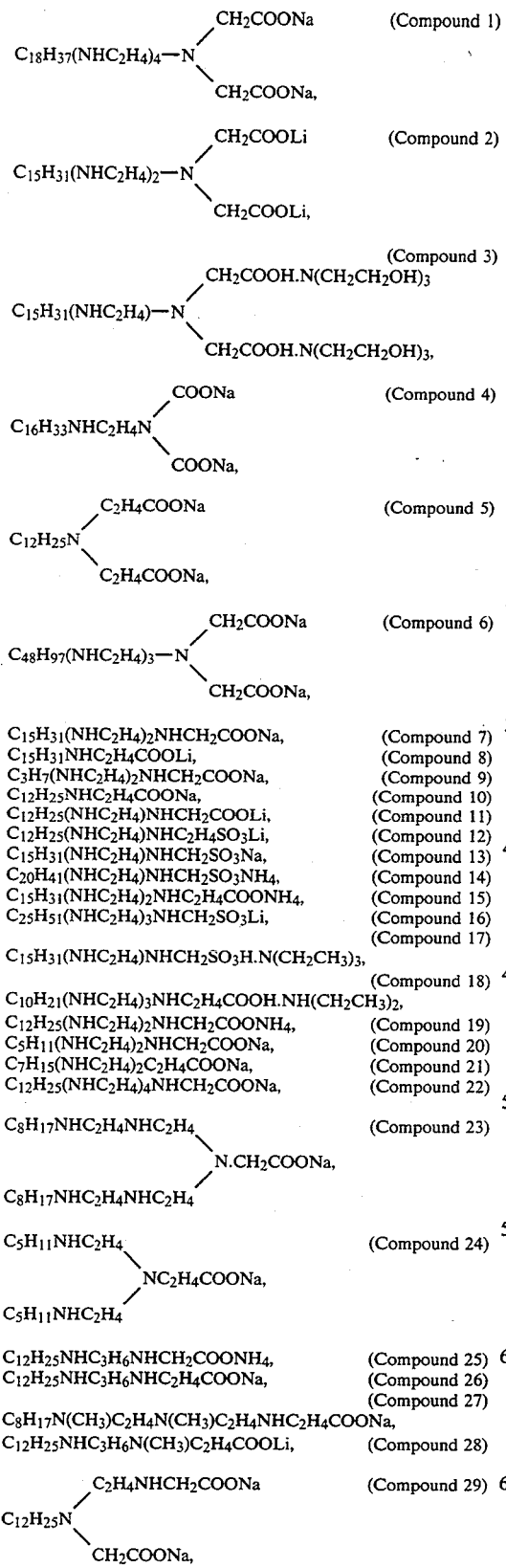

$C_{15}H_{31}(NHC_2H_4)_2NHCH_2COONa$, (Compound 7)
$C_{15}H_{31}NHC_2H_4COOLi$, (Compound 8)
$C_3H_7(NHC_2H_4)_2NHCH_2COONa$, (Compound 9)
$C_{12}H_{25}NHC_2H_4COONa$, (Compound 10)
$C_{12}H_{25}(NHC_2H_4)NHCH_2COOLi$, (Compound 11)
$C_{12}H_{25}(NHC_2H_4)NHC_2H_4SO_3Li$, (Compound 12)
$C_{15}H_{31}(NHC_2H_4)NHCH_2SO_3Na$, (Compound 13)
$C_{20}H_{41}(NHC_2H_4)NHCH_2SO_3NH_4$, (Compound 14)
$C_{15}H_{31}(NHC_2H_4)_2NHC_2H_4COONH_4$, (Compound 15)
$C_{25}H_{51}(NHC_2H_4)_3NHCH_2SO_3Li$, (Compound 16)
$C_{15}H_{31}(NHC_2H_4)NHCH_2SO_3H.N(CH_2CH_3)_3$, (Compound 17)
$C_{10}H_{21}(NHC_2H_4)_3NHC_2H_4COOH.NH(CH_2CH_3)_2$, (Compound 18)
$C_{12}H_{25}(NHC_2H_4)_2NHCH_2COONH_4$, (Compound 19)
$C_5H_{11}(NHC_2H_4)_2NHCH_2COONa$, (Compound 20)
$C_7H_{15}(NHC_2H_4)_2C_2H_4COONa$, (Compound 21)
$C_{12}H_{25}(NHC_2H_4)_4NHCH_2COONa$, (Compound 22)

$C_{12}H_{25}NHC_3H_6NHCH_2COONH_4$, (Compound 25)
$C_{12}H_{25}NHC_3H_6NHCH_2C_2H_4COONa$, (Compound 26)
(Compound 27)
$C_8H_{17}N(CH_3)C_2H_4N(CH_3)C_2H_4NHC_2H_4COONa$,
$C_{12}H_{25}NHC_3H_6N(CH_3)C_2H_4COOLi$, (Compound 28)

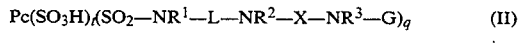

The content of the compounds represented by the general formula (I) used in the present invention, such as those described above, in the ink is preferably within a range of from 0.01 to 20% by weight, more preferably from 0.1 to 10.0% by weight though it may vary depending entirely on the application and purpose of the ink, the kind of a coloring material used, and the composition of the ink.

No particular limitation is imposed on the coloring material used in the ink according to the present invention, and various kinds of coloring materials such as dyes and pigments may hence be used.

Among these coloring materials, taking the easiness of formation of ink and the stability of ink into consideration, for example, acid dyes, basic dyes and direct dyes are easy to use. Particularly useful coloring materials are direct dyes. Particularly preferred are direct dyes having a sulfonic group. The direct dyes may preferably have a nitrogen atom on a site other than a divalent organic linking group.

Of these coloring materials, dyes having at least an amino group or a cyclic group forming a 5- or 6-membered ring together with at least one nitrogen atom are particularly preferred.

More specifically, examples of the above-described coloring materials may include C.I. Direct Black 168, C.I. Direct Black 154, C.I. Direct Yellow 142, C.I. Direct Yellow 86, C.I. Direct Red 227, C.I. Direct Blue 199, and coloring materials represented by the following general formulae (II) and (III) (in the form of a free acid). However, the coloring materials are not limited to these compounds.

$$Pc(SO_3H)_f(SO_2-NR^1-L-NR^2-X-NR^3-G)_q \quad (II)$$

wherein

Pc denotes a metal-containing phthalocyanine ring,
$R^1$, $R^2$ and $R^3$ denote independently H, alkyl, substituted alkyl, alkenyl, substituted alkenyl, aralkyl or substituted aralkyl,
L denotes a divalent organic linking group,
X denotes a carbonyl group, or a group of the formula

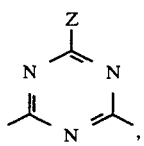 (2)

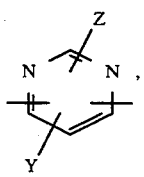 (3)

-continued or

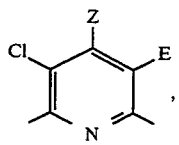
(4)

Z denotes NR⁴R⁵, SR⁶ or OR⁶,
Y denotes H, Cl, Z, SR⁷ or OR⁷,
E denotes Cl or CN,
R⁴, R⁵, R⁶ and R⁷ are independently H, alkyl substituted alkyl, aryl, substituted aryl, aralkyl or substituted aralkyl, or R⁴ and R⁵ may form a 5- or 6- membered ring together with the nitrogen atom,
G denotes a colorless organic residue substituted by one or two COSH's or COOH's, and
t+q is an integer of 3 or 4.

An exemplary compound of the general formula (II) may include the compound of the formula

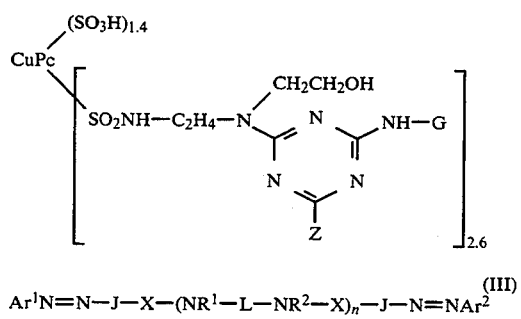

$$Ar^1N=N-J-X-(NR^1-L-NR^2-X)_n-J-N=NAr^2 \quad (III)$$

wherein
J denotes a radical of the formula

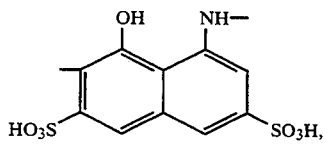

Ar¹ and Ar² denote independently H, alkyl, substituted alkyl, alkenyl or substituted alkenyl,
L denotes a divalent organic linking group,
n is 0 or 1,
X denotes a carbonyl group, or a group of the formula

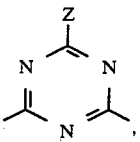
(2)

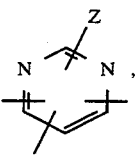
(3)

or

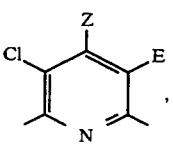
(4)

Z denotes NR³R⁴, SR⁵ or OR⁵,
Y denotes H, Cl, SR⁶ or OR⁶,
E denotes Cl or CN,
R³, R⁴, R⁵ and R⁶ are independently H, alkyl, substituted alkyl, alkenyl, substituted alkenyl, aryl, substituted aryl, aralkyl or substituted aralkyl, or R³ and R⁴ may form a 5- or 6-membered ring together with the nitrogen atom,
the compound represented by said formula (III) having groups selected from COOH and COSH by at least the same number as that of SO₃H.

Specific examples thereof may include the following compounds of the formulae

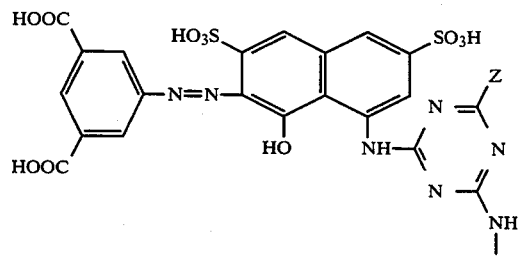

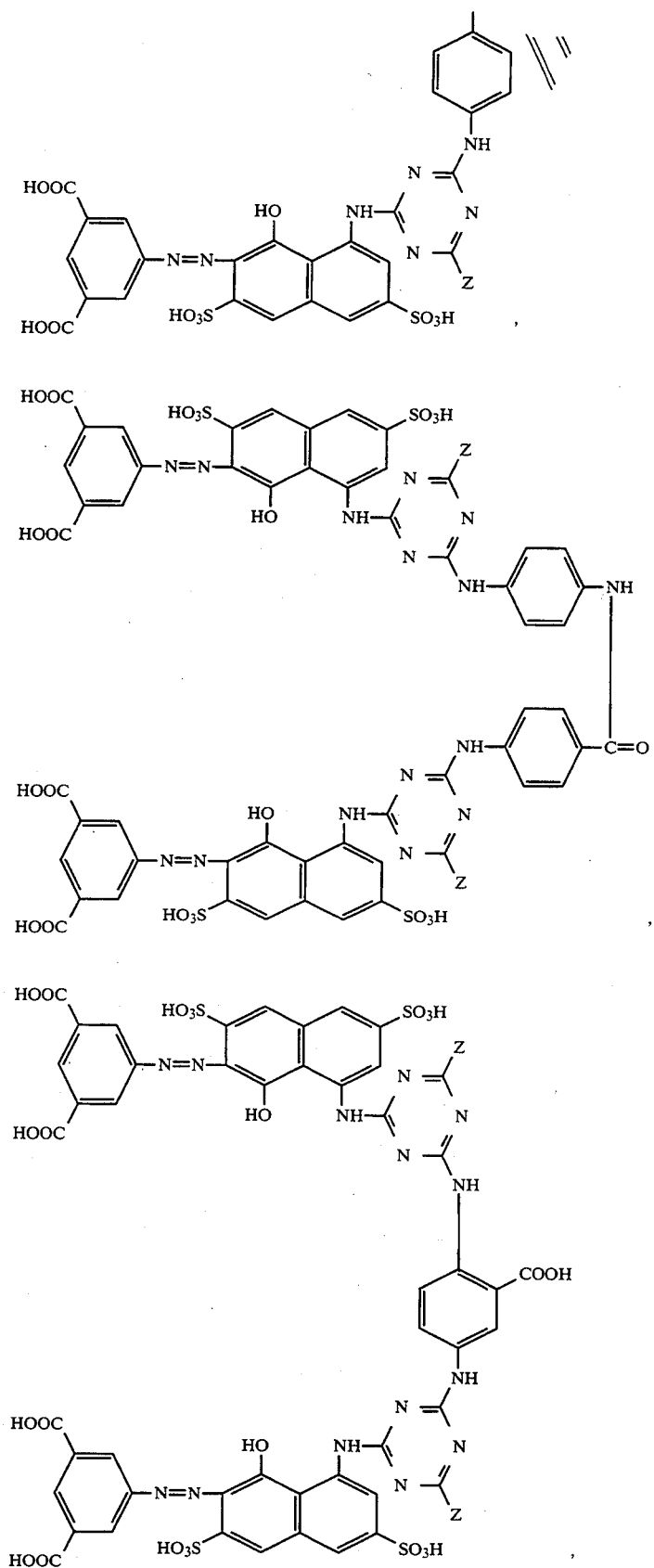

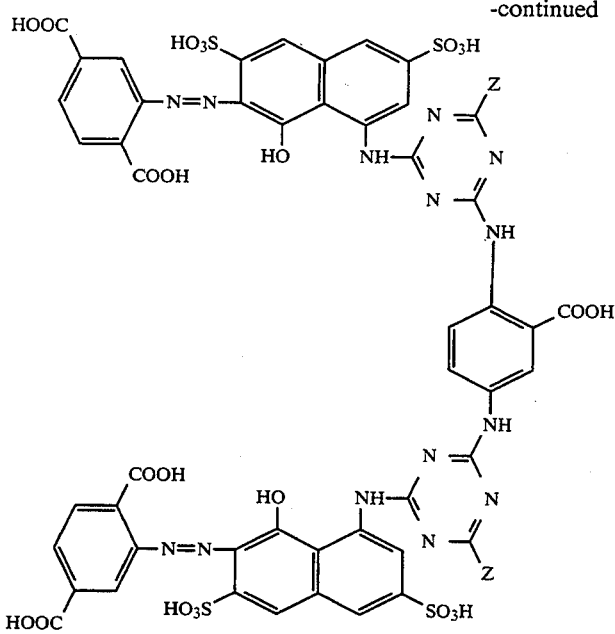

The coloring materials used in the ink according to the present invention are not limited to the above-described examples, and other coloring materials such as various kinds of dyes and pigments may by used.

No particular limitation is imposed on the amount of these coloring materials to be used. However, it is preferable to use them in a range of, generally, from 0.1% to 15% by weight, more preferably, from 0.1% to 10% by weight based on the total weight of the ink.

If a pH adjustor is added to the ink according to the present invention, it is preferable to adjust the pH of the ink to more alkaline side than that at the maximum viscosity peak of the ink, in particular, if the ink is desired to have better recordability.

As the pH adjustor, various basic or acidic components may be used. Volatile basic components such as ammonia and amines are particularly preferred. Sulfuric acid, acetic acid, hydrochloric acid or the like is used if the acidic component is used.

The inks of the present invention may contain, in addition to the above components, various additives such as water-soluble organic solvents, surfactants, rust preventives, antiseptics, mildewproofing agents, antioxidants, reduction inhibitors, vaporization accelerators, chelating agents and water-soluble polymers as necessary.

The liquid medium useful in the practice of this invention is preferably a-mixed solvent of water and a water-soluble organic solvent. Specific examples of the water-soluble organic solvent may include amides such as dimethylformamide and dimethylacetamide; ketones such as acetone; ethers such as tetrahydrofuran and dioxane; polyalkylene glycols such as polyethylene glycol and polypropylene glycol; alkylene glycols whose alkylene moiety has 2 to 6 carbon atoms, such as ethylene glycol, propylene glycol, butylene glycol, triethylene glycol, hexylene glycol and diethylene glycol; thiodiglycol; glycerol; 1,2,6-hexanetriol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 1,3-dimethyl-2-imidazolidinone; triethanolamine; sulfolane; dimethylsulfoxide; cyclic amide compounds such as 2-pyrrolidone and ε-caprolactam; imide compounds such as succinimide; and the like.

The content of the water-soluble organic solvent in the ink is preferably within a range of, generally, from 1% to 40% by weight, more preferably, from 3% to 30% by weight based on the total weight of the ink.

The content of water to be used in the ink is within a range of from 30 to 95% by weight. When the amount of water is less than 30% by weight, the solubility of the coloring material and the like is deteriorated, and the viscosity of a resulting ink is increased. It is hence not preferable to use water in such a small amount. On the other hand, when the amount of water is greater than 95% by weight, the vaporizing components are too great to satisfy sufficient crusting property.

The inks according to the present invention are particularly suitable for use in an ink-jet recording system of a type that an ink is ejected by the bubbling phenomenon of the ink caused by thermal energy. This recording system has a feature that the ejection of the ink becomes extremely stable, and no satellite dots generate. In this case, the thermal properties (for example, the specific heat, the coefficient of thermal expansion, the heat conductivity, etc.) of the inks may however be controlled in some cases.

The inks of this invention are desirably controlled so as to have, as their own physical properties, a surface tension of 30 to 68 dyn/cm and a viscosity of 15 cPs or lower, preferably 10 cPs or lower, more preferably 5 cPs or lower as measured at 25° C. from the viewpoint of solving the problem of water resistance of prints when recorded on plain paper or the like and at the same time, making the matching of the inks with an head for ink-jet recording good.

Accordingly, in order to control the physical properties of the inks to the above-described values and solve the problem on plain paper, it is preferred that the content of water in the inks of this invention be adjusted to from not less than 50% to not more than 98% by weight, preferably, from not less than 60% to not more than 95% by weight.

The inks according to this invention may suitably be used, in particular, in an ink-jet recording system of a type that recording is conducted by ejecting droplets of an ink by the action of thermal energy. However, the inks may also be used for general-purpose writing utensils.

As preferred methods and apparatus for conducting recording by using the inks according to the present invention, may be mentioned a method and apparatus in which thermal energy corresponding to recording signals is applied to an ink within a recording head, and ink droplets are generated in accordance with the thermal energy.

Figure 1:
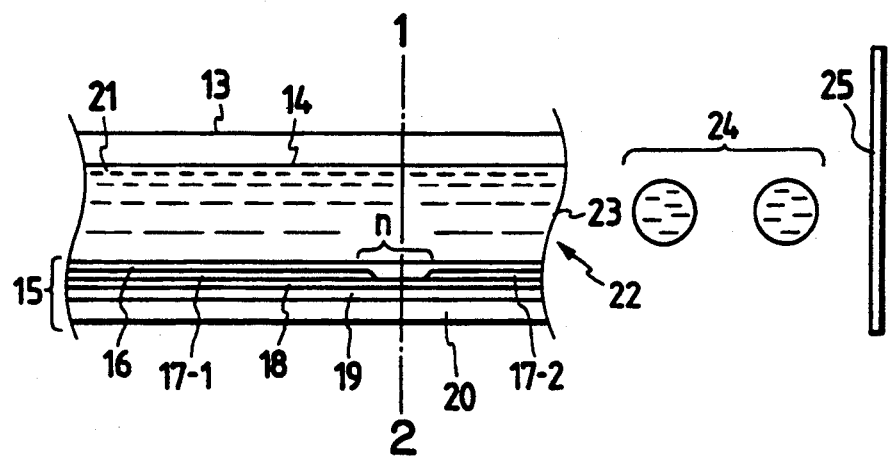
FIG. 1 is a longitudinal cross-sectional view of a head of an ink-jet recording apparatus.
Figure 2:
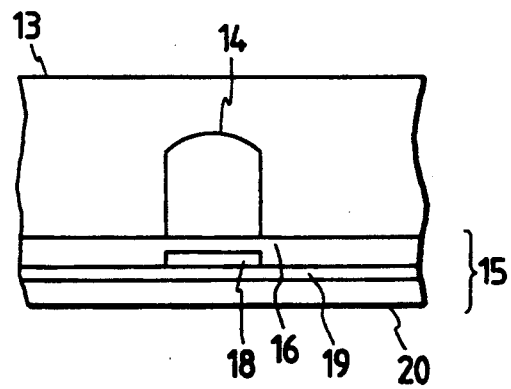
FIG. 2 is a transverse cross-sectional view of the head of the ink-jet recording apparatus.
Figure 3:
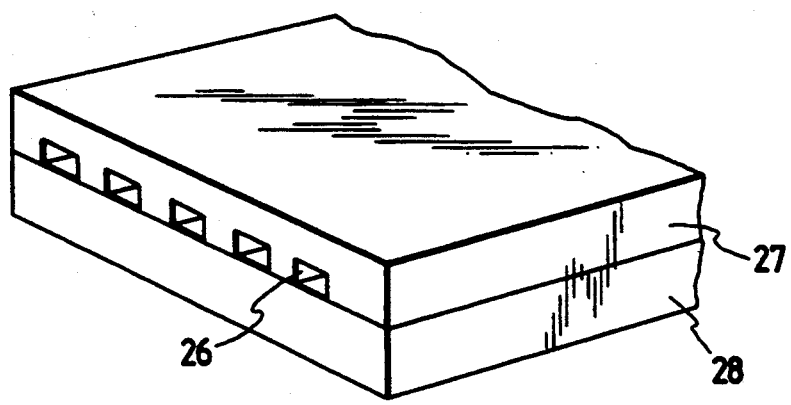
FIG. 3 is a perspective view of the appearance of a multi-head which is an array of such heads as shown in FIG. 1.

Examples of the construction of an head, which is a main component of such an apparatus, are illustrated in FIGS. 1, 2 and 3.

A head 13 is composed of a glass, ceramic or plastic plate or the like having an ink-passing channel 14 and a heating head 15, which is used for thermal recording (the drawings show a head to which, however, is not limited), said heating head 15 being bonded to the plate. The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice 22 (a minute opening) and forms a meniscus 23 owing to a pressure P.

Now, upon application of electric signals to the electrodes 17-1, 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording material 25 in the form of recording droplets 24.

FIG. 3 illustrates an appearance of a multi-head composed of an array of a number of heads as shown in FIG. 1. The multi-head is formed by closely bonding a glass plate 27 having a number of channels 26 to a heating head 28 similar to the head as illustrated in FIG. 1.

Incidentally, FIG. 1 is a cross-sectional view of the head 13 taken along the flow path of the ink, and FIG. 2 is a cross-sectional view taken along line 1-2 in FIG. 1.

Figure 4:
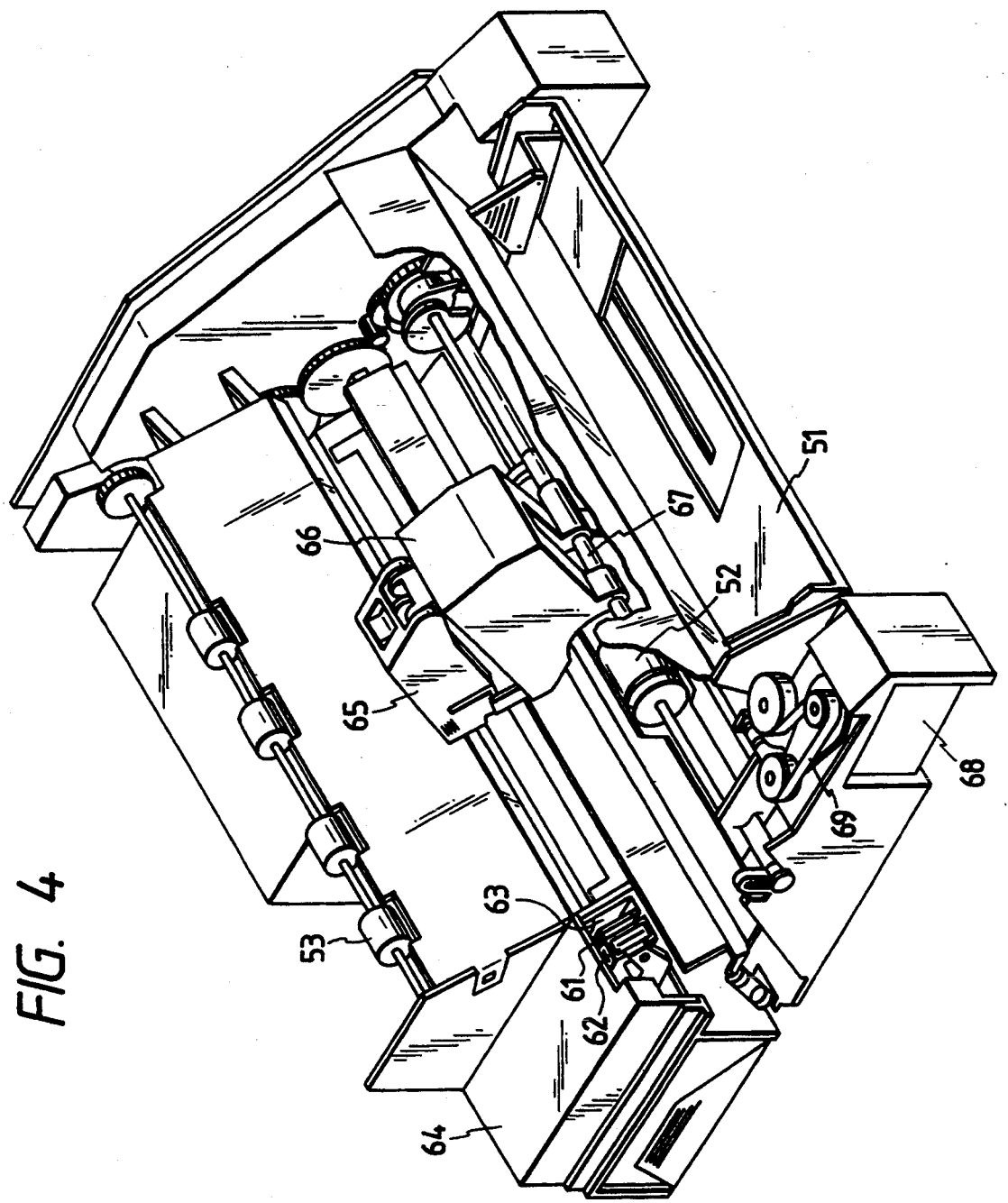
FIG. 4 is a perspective view of an illustrative ink-jet recording apparatus.

FIG. 4 illustrates an example of an ink-jet recording apparatus in which such a head has been incorporated. In FIG. 4, reference numeral 61 designates a blade serving as a wiping member, one end of which is a stationary end held by a blade-holding member to form a cantilever. The blade 61 is provided at a position adjacent to a region in which a recording head operates, and in this embodiment, is held in such a form that it protrudes to the course through which the recording head is moved. Reference numeral 62 indicates a cap, which is provided at a home position adjacent to the blade 61, and is so constituted that it moves in a direction perpendicular to a direction in which the recording head is moved and comes into contact with the face of ejection openings to cap it. Reference numeral 63 denotes an ink-absorbing member provided adjoiningly to the blade 61 and, similar to the blade 61, held in such a form that it protrudes to the course through which the recording head is moved. The above-described blade 61, cap 62 and absorbing member 63 constitute a recovery portion 64 for the recording head, where the blade 61 and absorbing member 63 remove off water, dust and/or the like from the face of the ink-ejecting openings.

Reference numeral 65 designates the recording head having an ejection-energy-generating means and serving to eject the ink onto a recording material set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording materials are separately inserted, and paper feed rollers driven by a motor (not illustrated), respectively. With such construction, the recording material is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
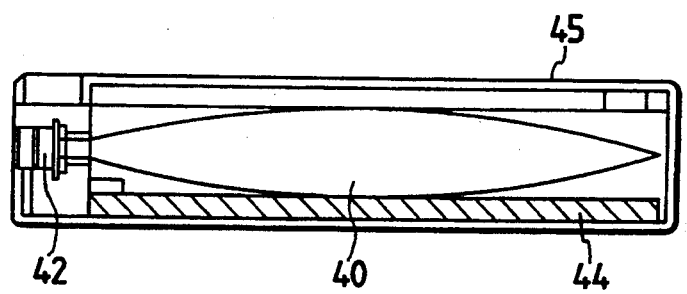
FIG. 5 is a longitudinal cross-sectional view of an ink cartridge.

FIG. 5 illustrates an exemplary ink cartridge in which an ink fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. It is preferred in this invention that the ink container portion is formed of a polyolefin, in particular, polyethylene, at its surface with which the ink comes into contact. The ink-jet recording apparatus used in this invention may not be limited to the apparatus as described above in which the head and the ink cartridge are separately provided. Therefore, a device in which these members are integrally formed as shown in FIG. 6 can also be preferably used.

Figure 6:
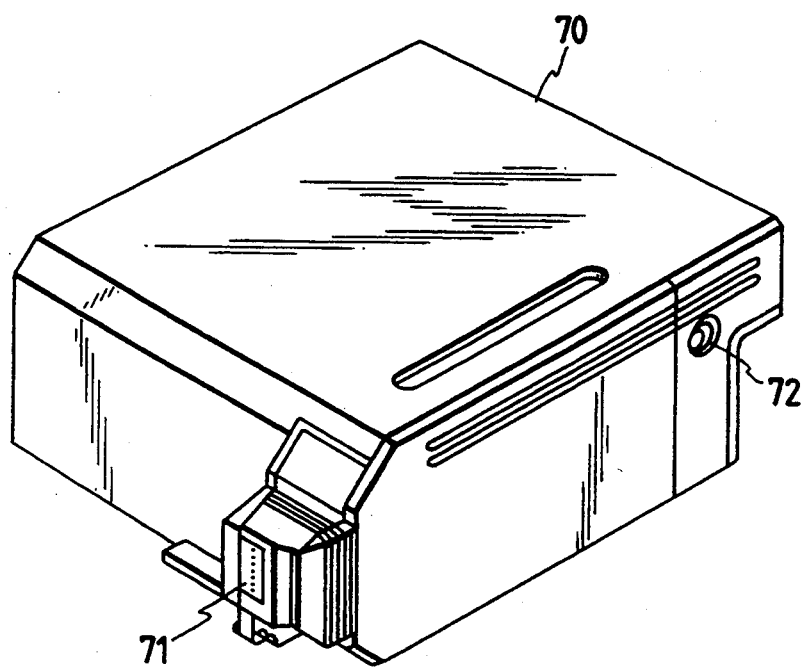
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. In this invention, polyurethane, cellulose or polyvinyl acetal is preferably used as a material for the ink-absorbing member. Reference numeral 72 indicates an air passage for communicating the interior of the recording unit 70 with the atmosphere. This recording unit 70 can be used in place of the recording head shown in FIG. 3, and is detachably installed on the carriage 66.

The present invention will hereinafter be described more specifically by the following Examples and Comparative Examples. Incidentally, all designations of "part" or "parts" and "%" as will be used in the following examples mean part or parts by weight and % by weight unless expressly noted.

EXAMPLES 1 TO 8

After their corresponding components as described below were mixed and thoroughly stirred into solutions, the resulting solutions were separately filtered under pressure through a "Fluoropore Filter" (trade name; product of Sumitomo Electric Industries, Ltd.) having a pore size of 0.45 μm, thereby preparing respective inks according to Examples 1 to 8 of the present invention. The pH-value of each ink was adjusted to about 9.5 with a salt component of the respective compound.

| Ink composition of Example 1: | |
|---|---|
| C.I. Direct Black 168 | 2 parts |
| Thiodiglycol | 10 parts |
| Water | 84.5 parts |
| Compound 8 | 3 parts |
| Ammonium sulfate | 0.5 part |
| Ink composition of Example 2: | |
| C.I. Direct Black 168 | 2.5 parts |
| 2-Pyrrolidone | 10 parts |
| Water | 82.75 parts |
| Compound 21 | 4 parts |
| Sodium hydrogensulfite | 0.75 part |
| Ink composition of Example 3: | |
| C.I. Direct Black 168 | 2 parts |
| Thiodiglycol | 10 parts |
| Isopropyl alcohol | 4 parts |
| Water | 80 parts |
| Compound 9 | 4 parts |
| Ink composition of Example 4: | |
| C.I. Direct Blue 199 | 2 parts |
| Dipropylene glycol | 10 parts |
| Water | 87 parts |
| Compound 19 | 1 part |
| Ink composition of Example 5: | |
| C.I. Direct Yellow 86 | 2 parts |
| Diethylene glycol | 10 parts |
| Water | 87.5 parts |
| Compound 19 | 0.5 part |
| Ink composition of Example 6: | |
| C.I. Direct Black 154 | 3 parts |
| Ethylene glycol | 5 parts |
| Thiodiglycol | 5 parts |
| Water | 85.5 parts |
| Compound 25 | 1.5 parts |
| Ink composition of Example 7: | |
| C.I. Direct Red 227 | 3 parts |
| Diethylene glycol | 5 parts |

| -continued | |
|---|---|
| Thiodiglycol | 5 parts |
| Water | 82.5 parts |
| Compound 10 | 4.5 parts |
| Ink composition of Example 8: | |
| C.I. Direct Black 168 | 2 parts |
| C.I. Food Black 1 | 1 part |
| Thiodiglycol | 10 parts |
| Ethanol | 4 parts |
| Water | 78.3 parts |
| Compound 15 | 4 parts |
| Ammonium hydrochloride | 0.7 part |
| Sodium hydroxide | 0.2 parts |

In the compositions of Examples 1 to 7, their corresponding compounds represented by the general formula (I) were omitted, and instead, purified water was supplied to prepare respective inks according to Comparative Examples 1 to 7.

COMPARATIVE EXAMPLE 8

Compound 15 in Example 8 was changed to dimethyldodecylbetaine to prepare an ink according to Comparative Example 8.

Using each of the inks obtained in Examples 1 to 8 and Comparative Examples 1 to 8, printing test was conducted using, as an ink-jet recording apparatus, an On-Demand type ink-jet printer making use of a heating element as an ejection-energy source to evaluate the inks in (1) water resistance, (2) frequency response characteristic, (3) print quality and (4) boundary bleeding between areas applied with inks of different colors in a color image in accordance with the following respective standards. The results are given in Tables 1 to 3.

Incidentally, the above-described ink-jet recording apparatus was operated under the following printing conditions:

Drive voltage: 26 V
Resistance of a heating resistor: 150 Ω
Frequency: 4 kHz.

Methods and Standards for Evaluation (1) Water Resistance

After an ink to be tested was charged into the printer to print English characters and numerals and solid print areas on (A) commercially-available acid paper and (B) commercially-available neutralized paper, the printer was stopped and the resulting print was left over for at least 1 hour, followed by measurement of the image density of the print by a "Macbeth RD915" (trade name; manufactured by Macbeth Company). After the print sample was then immersed for at least 3 minutes in a container filled with water, it was allowed to stand and dried to measure its image density again, whereby the percent retention of the image density was calculated. The water resistance was evaluated by ranking the value in accordance with the following standard:

A: Percent retention of image density not lower than 80%;
B: Percent retention of image density ranging from 66% to 79%;
C: Percent retention of image density not higher than 65.

(2) Frequency Response Characteristic

The resulting print was observed by naked eyes with respect to its printing conditions, namely, conditions of blurred characters and blank areas, and defective ink-droplet impact such as splash and slippage to evaluate the ink in the frequency response characteristic by ranking the conditions in accordance with the following standard:

A: The follow-up condition of the ink to the frequency was substantially good, and none of blurred characters, blank areas and defective ink-droplet impact were observed upon printing of characters, but blur was slightly recognized upon solid printing;

B: None of blurred characters and blank areas were observed, but defective ink-droplet impact was partly recognized upon printing of characters, and upon solid printing, blur and blank areas were observed at portions of about one-third of the whole solid printed area;

C: Blur and blank areas were observed to a great extent upon solid printing, and blurred characters and defective ink-droplet impact were also recognized to a large extent upon printing of characters.

(3) Evaluation of Print Quality

English characters and numerals were printed on (A) commercially-available acid paper and (B) commercially-available neutralized paper by the printer, and the resulting print was left over for at least 1 hour. The print was then observed by a microscope and naked eyes to evaluate the ink in the print quality by ranking the degrees of sharpness of the letters and whisker-like feathering occurred on the letters in accordance with the following standard:

A: The letters were sharp, and no whisker-like feathering occurred;

B: The letters were sharp, but whisker-like feathering slightly occurred;

C: The letters were dull, or whisker-like feathering occurred to a relatively great extent;

D: The letters were dull, and whisker-like feathering also occurred to a great extent.

(4) Resistance to Boundary Bleeding Between Areas Applied with Inks of Different Colors in Color Image The inks in Examples 4, 5 and 6 were combined to use as inks in Example 9, thereby evaluating them in boundary bleeding between areas applied with inks of different colors using an ink-jet color printer, "BJC 800" (trade name, manufactured by Canon Inc.). The inks in Comparative Examples 1, 4 and 5 were also combined to use as inks in Comparative Example 9, thereby conducting the same evaluation as described above.

The results of the evaluation were ranked in accordance with the following standard:

A: Boundaries between areas applied with inks of different colors were sharp, and no boundary bleeding was recognized;

B: Boundaries between areas applied with inks of different colors blurred, and so boundary bleeding occurred.

TABLE 1

| Evaluation | Results of evaluation | | | | | | | |
|---|---|---|---|---|---|---|---|---|
| properties | Example | | | | | | | |
| | 1 | 2 | 3 | 4 | 5 | 6 | 7 | 8 |
| Water resistance | A | A | A | A | A | A | A | A |
| | B | A | A | A | A | A | A | A |
| Frequency response characteristic | A | A | A | A | A | A | A | A |
| Print quality | A | A | A | A | A | A | A | A |
| | B | A | A | A | A | A | A | A |

TABLE 2

| Evaluation | Results of evaluation | | | | | | | |
|---|---|---|---|---|---|---|---|---|
| properties | Comparative Example | | | | | | | |
| | 1 | 2 | 3 | 4 | 5 | 6 | 7 | 8 |
| Water resistance | A | B | B | B | B | B | B | A |
| | B | B | B | B | C | C | B | C |
| Frequency response characteristic | A | A | A | A | A | A | A | A |
| Print quality | A | B | C | B | C | B | B | D |
| | B | B | B | B | B | B | B | C |

TABLE 3

| Evaluation property | Results of evaluation | |
|---|---|---|
| | Example 9 | Comparative Example 9 |
| Resistance to bleeding between areas applied with inks of different colors in color image | A | B |

According to the present invention, as described above, there can be provided inks which can improve the water resistance of prints without adversely affecting the image quality of the prints and the like when conducting printing on so-called plain paper such as acid paper and neutralized paper, commonly used in offices and the like.

Further, the present invention can provide inks which are good in stability even after stored for a long period of time and can conduct recording with high reliability without the least problem in an ink-jet recording system.

What is claimed is:

1. An ink comprising at least a coloring material and a liquid medium dissolving or dispersing the coloring material therein, wherein the viscosity of the ink reaches a maximum peak in a pH range of from 4 to 10, said ink further comprises a compound whose solubility reaches a minimum peak in a pH range of from 4 to 10 represented by the general formula

wherein
$R_1$ denotes an alkyl group having 1 to 48 carbon atoms, or a hydrogen atom, $R_2$ denotes $(CH_2)_a$—$X_1$ or a hydrogen atom, in which a is an integer of 1 to 4, $R_3$ denotes $(CH_2)_b$—$X_2$, $R_4$—Y or a hydrogen atom, in which b is an integer of 1 to 4, $R_4$ denotes an alkyl group having 1 to 48 carbon atoms, or a hydrogen atom, Z denotes $(NR_5C_lH_{2l})_c(NHC_nH_{2n})_d$, in which l is an integer of 2 to 4, n is an integer of 2 to 4, and c+d is an integer of 0 to 50, Y denotes $(NR_6C_mH_{2m})_e(NHC_pH_{2p})_f$, in which m is an integer of 2 to 4, p is an integer of 2 to 4, and e+f is an integer of 0 to 50, $R_5$ denotes $(CH_2)_g$—$X_3$, in which g is an integer of 1 to 4, $R_6$ denotes $(CH_2)_h$—$X_4$, in which h is an integer of 1 to 4, and $X_1$, $X_2$, $X_3$ and $X_4$ independently denote groups selected from the group consisting of a carboxyl group, a salt of the carboxyl group, a sulfonic group, a salt of the sulfonic group and a hydrogen atom, with a proviso that $R_2$ and $R_3$, and c and e are not a hydrogen atom and 0 respectively at the same time, and $X_1$, $X_2$, $X_3$ and $X_4$ are not a hydrogen atom at the same time.

2. The ink according to claim 1, wherein in the compound represented by the general formula (I), $X_1$, $X_2$, $X_3$ and $X_4$ are independently selected from the group consisting of salts of carboxyl and sulfonic groups and a hydrogen atom.

3. The ink according to claim 1, wherein in the compound represented by the general formula (I), $R_1$ and $R_4$ are independently an alkyl group having 1 to 32 carbon atoms, c+d and e+f are independently an integer of 0 to 16, and a, b, g and h are independently an integer of 1 or 2.

4. The ink according to any one of claims 1 to 3, wherein the coloring material is a direct dye.

5. The ink according to claim 4, wherein the coloring material is a dye having at least one sulfonic group.

6. The ink according to claim 4, wherein the coloring material is a dye having a nitrogen atom on a site other than a divalent organic linking group.

7. The ink according to claim 1, wherein the pH of the ink is adjusted to more alkaline side than that at the maximum viscosity peak of the ink.

8. An ink-jet recording method comprising ejecting droplets of an ink out of an orifice in accordance with a recording signal to make a record on a recording material, wherein said ink is the ink as set forth in claim 1.

9. The ink-jet recording method according to claim 8, wherein the ink droplets are ejected by applying thermal energy to the ink.

10. A recording unit comprising an ink container portion with an ink held therein and a head from which the ink is ejected in the form of ink droplets, wherein said ink is the ink as set forth in claim 1.

11. The recording unit according to claim 10, wherein the head is a head which causes thermal energy to act on the ink to eject its droplets.

12. The recording unit according to claim 10, wherein the ink container portion contains an ink-absorbing member therein.

13. The recording unit according to claim 10, wherein the ink container portion is formed of polyurethane, cellulose or polyvinyl acetate.

14. An ink cartridge comprising an ink container portion with an ink held therein, wherein said ink is the ink as set forth in claim 1.

15. The ink cartridge according to claim 14, wherein the ink container portion is made of a polyolefin at its surface with which the ink comes into contact.

16. An ink-jet recording apparatus comprising a recording unit having an ink container portion with an ink held therein and a head from which the ink is ejected in the form of ink droplets, wherein said ink is the ink as set forth in claim 1.

17. The ink-jet recording apparatus according to claim 16, wherein the head is a head which causes thermal energy to act on the ink to eject its droplets.

18. The ink-jet recording apparatus according to claim 16, wherein the ink container portion contains an ink-absorbing member therein.

19. The ink-jet recording apparatus according to claim 16, wherein the ink container portion is formed of polyurethane, cellulose or polyvinyl acetate.

20. An ink-jet recording apparatus comprising a recording head from which an ink is ejected in the form of ink droplets, an ink cartridge having an ink container portion with the ink held therein, and an ink feeder for feeding the ink from the ink cartridge to the recording head, wherein said ink is the ink as set forth in claim 1.

21. The ink-jet recording apparatus according to claim 20, wherein the head is a head which causes thermal energy to act on the ink to eject its droplets.

22. The ink-jet recording apparatus according to claim 20, wherein the ink container portion is made of a polyolefin at its surface with which the ink comes into contact.

* * * * *

UNITED STATES PATENT AND TRADEMARK OFFICE
CERTIFICATE OF CORRECTION

PATENT NO. : 5,409,529
DATED : April 25, 1995
INVENTOR(S) : AKIRA NAGASHIMA ET AL.

It is certified that error appears in the above-indentified patent and that said Letters Patent is hereby corrected as shown below:

ON THE COVER PAGE

[56] REFERENCES CITED

U.S. PATENT DOCUMENTS

Line 28, Bundlach et al. should read --Gundlach et al.--.

[56] REFERENCES CITED

FOREIGN PATENT DOCUMENTS

Line 2, "57-577609" should read --57-57760--.

Line 3, "2255876" should read --2-255876--.

Line 4, "2296878" should read --2-296878--.

Column 1,

Line 52, "57-577760" should read --57-57760--.

Column 4,

Line 14, "derivative" should read --derivatives--.

Column 9,

Line 6, " \\\\ " should be deleted.

UNITED STATES PATENT AND TRADEMARK OFFICE
CERTIFICATE OF CORRECTION

PATENT NO. : 5,409,529
DATED : April 25, 1995
INVENTOR(S) : Akira Nagashima et al.

It is certified that error appears in the above-indentified patent and that said Letters Patent is hereby corrected as shown below:

<u>Column 11,</u>

Line 53, "a-mixed" should read --a mixed--.

<u>Column 12,</u>

Line 62, "an" should read --a--.

<u>Column 13,</u>

Line 16, "an" should read --a--.

Line 67, ". recording" should read --recording--.

<u>Column 16,</u>

Line 13, insert heading: --COMPARATIVE EXAMPLES 1 TO 7--.

UNITED STATES PATENT AND TRADEMARK OFFICE
CERTIFICATE OF CORRECTION

PATENT NO. : 5,409,529
DATED : April 25, 1995
INVENTOR(S) : Akira Nagashima, et al It is certified that error appears in the above-indentified patent and that said Letters Patent is hereby corrected as shown below:

<u>Column 18,</u>

Line 58, "$H2_m)_e$" should read --$H_{2m})_e$--

Signed and Sealed this

Nineteenth Day of September, 1995

Attest:

BRUCE LEHMAN

Attesting Officer

Commissioner of Patents and Trademarks